(12) United States Patent
Murata

(10) Patent No.: US 11,718,108 B2
(45) Date of Patent: Aug. 8, 2023

(54) PRINTER, CONTROL METHOD OF PRINTER, AND COMPUTER READABLE MEDIUM INCLUDING FIRST MODE IN WHICH ICONS REPRESENTING PRINTING ITEMS ARE SELECTABLE AND SECOND MODE IN WHICH ICON REPRESENTING PRINTING ITEMS DOES NOT REQUIRE SELECTION

(71) Applicant: SATO HOLDINGS KABUSHIKI KAISHA, Tokyo (JP)

(72) Inventor: Yohei Murata, Saitama (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/425,801

(22) PCT Filed: Feb. 3, 2020

(86) PCT No.: PCT/JP2020/003994
§ 371 (c)(1),
(2) Date: Jul. 26, 2021

(87) PCT Pub. No.: WO2020/166417
PCT Pub. Date: Aug. 20, 2020

(65) Prior Publication Data
US 2022/0169045 A1    Jun. 2, 2022

(30) Foreign Application Priority Data

Feb. 14, 2019 (JP) .................................. 2019-024648

(51) Int. Cl.
*B41J 11/00* (2006.01)
*G06F 3/12* (2006.01)
(Continued)

(52) U.S. Cl.
CPC .......... *B41J 11/009* (2013.01); *B41J 11/0095* (2013.01); *G06F 3/1204* (2013.01);
(Continued)

(58) Field of Classification Search
None
See application file for complete search history.

(56) References Cited

U.S. PATENT DOCUMENTS 7,604,229 B2 * 10/2009 Inui ........................ B41J 11/485
399/45
2001/0024590 A1    9/2001 Woodman et al.
(Continued)

FOREIGN PATENT DOCUMENTS

CN    101290561 A    10/2008
JP    63-15750 A    1/1988
(Continued)

*Primary Examiner* — Haris Sabah
(74) *Attorney, Agent, or Firm* — Foley & Lardner LLP

(57) ABSTRACT

A printer that allows selection of a plurality of types of print media includes, a control unit that stores a plurality of pieces of registration information, the registration information including one set of a plurality of printing setting items used for printing, the plurality of printing setting items include an item regarding the type of the print medium.

8 Claims, 19 Drawing Sheets

(51) Int. Cl.
*H04N 1/00* (2006.01)
*G03G 15/00* (2006.01)
(52) U.S. Cl.
CPC . *G03G 15/607* (2013.01); *G03G 2215/00751* (2013.01); *H04N 1/00708* (2013.01)

(56) References Cited

U.S. PATENT DOCUMENTS

| | | | |
|---|---|---|---|
| 2005/0030334 A1* | 2/2005 | Kai | B41J 11/009 |
| | | | 347/19 |
| 2006/0109502 A1* | 5/2006 | Nakajima | G06F 3/1215 |
| | | | 358/1.15 |
| 2008/0219685 A1* | 9/2008 | Muratani | B41J 13/0081 |
| | | | 399/45 |
| 2008/0259398 A1 | 10/2008 | Osuka et al. | |
| 2011/0058882 A1* | 3/2011 | Umeda | B41J 11/485 |
| | | | 400/582 |
| 2014/0268234 A1* | 9/2014 | Iida | G06K 15/1882 |
| | | | 358/1.15 |
| 2015/0271348 A1* | 9/2015 | Kimura | G06F 3/1238 |
| | | | 358/474 |
| 2016/0295045 A1* | 10/2016 | Saiki | H04N 1/0057 |
| 2018/0063347 A1* | 3/2018 | Conlon | H04N 1/00737 |
| 2018/0227451 A1* | 8/2018 | Sakamoto | H04N 1/00018 |
| 2018/0312289 A1* | 11/2018 | Gomes Da Costa | B26D 3/085 |

FOREIGN PATENT DOCUMENTS

| | | |
|---|---|---|
| JP | 7-33289 A | 2/1995 |
| JP | 7-266632 | 10/1995 |
| JP | 2008-074029 A | 4/2008 |
| JP | 2008-269265 A | 11/2008 |
| JP | 2016-036957 A | 3/2016 |

\* cited by examiner

PRINTER, CONTROL METHOD OF PRINTER, AND COMPUTER READABLE MEDIUM INCLUDING FIRST MODE IN WHICH ICONS REPRESENTING PRINTING ITEMS ARE SELECTABLE AND SECOND MODE IN WHICH ICON REPRESENTING PRINTING ITEMS DOES NOT REQUIRE SELECTION

TECHNICAL FIELD

The present invention relates to a printer, a control method of a printer, and a program.

BACKGROUND ART

A user needs to perform settings, such as a printing density and a printing speed, optimum for a print medium to be printed on a printer. As the printer, JP2008-074029A discloses a printer in which a printing density, a printing speed, and the like are set in a display screen and stored.

SUMMARY OF INVENTION

The conventional printer requires the settings again each time a print medium is changed, thereby increasing a labor. Furthermore, even in a case where settings corresponding to the print medium are preliminarily stored, when the print medium is changed to a different one, the settings need to be changed from the beginning, causing a problem of an increase in labor after all.

In view of this, an object of the present invention is to provide a printer configured to select a plurality of types of print media that allows improving a convenience.

According to one aspect of the present invention, there is provided a printer that allows selection of a plurality of types of print media. The printer includes a control unit that stores a plurality of pieces of registration information. The registration information includes one set of a plurality of printing setting items used for printing. The plurality of printing setting items includes an item regarding the type of the print medium.

According to the present invention, the plurality of pieces of registration information corresponding to the plurality of respective types of the print media are preliminarily stored. Therefore, even when the print medium is exchanged for a print medium of a different type, the printing can be performed based on the stored registration information, thereby reducing a labor of a user and improving a convenience.

DESCRIPTION OF EMBODIMENTS

The following describes a printer 1 according to embodiments of the present invention in detail with reference to the attached drawings.

Figure 1:
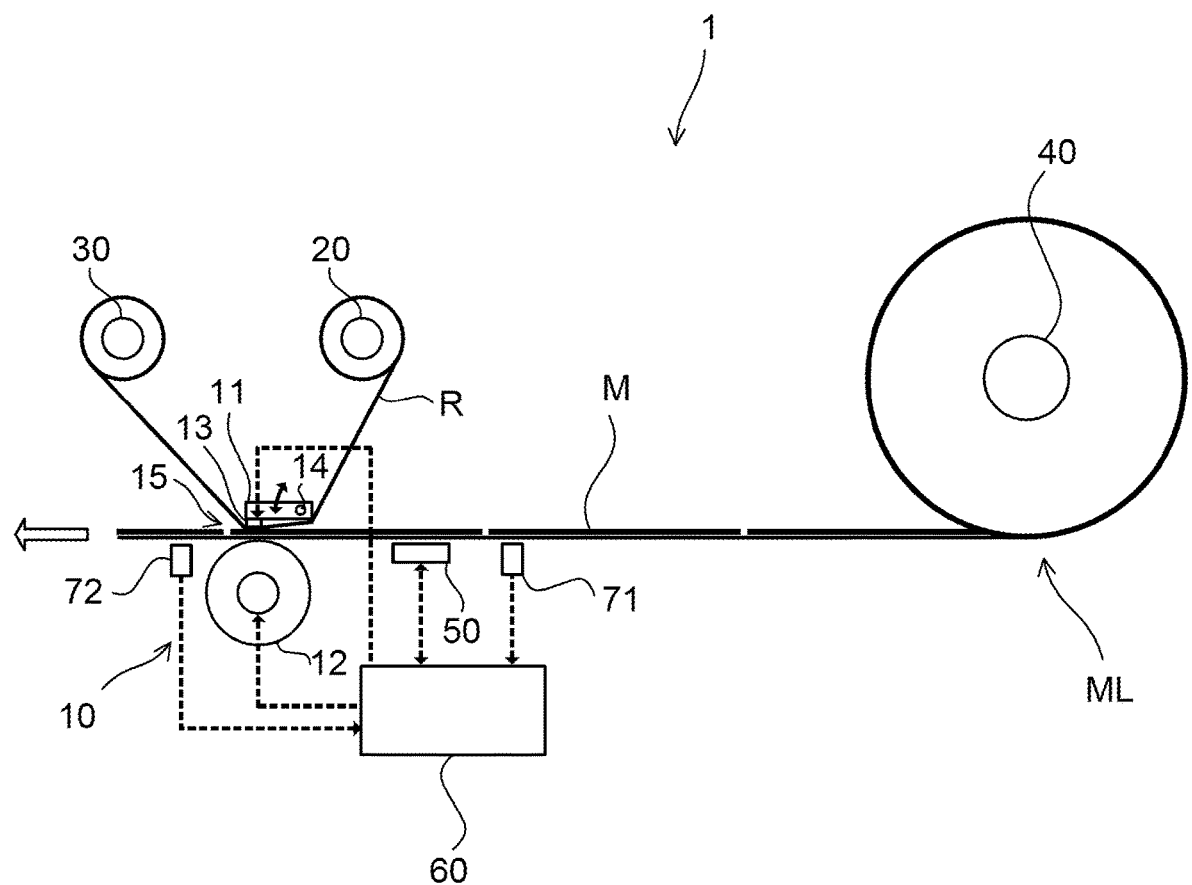
FIG. 1 is a schematic configuration diagram of a printer according to an embodiment of the present invention.

FIG. 1 is a schematic configuration diagram of the printer 1 to which the present invention is applied.

The printer 1 is of a thermal transfer type that prints by heating an ink ribbon R and transferring the ink of the ink ribbon R onto a print medium M. The printing medium M is configured, for example as a continuous body ML on which a plurality of labels are continuously attached temporarily at predefined intervals on a band-form backing paper and which is wound as a roll form.

It should be noted that, as the print medium M, not the label but a wristband (a wristband, a parent-child type wristband) described later can be used. An IC chip having a RFID specification and a RFID medium including an antenna can also be used as the print medium M.

As illustrated in FIG. 1, the printer 1 includes a printing mechanism 10, a ribbon supply shaft 20, a ribbon roll up shaft 30, a medium supply shaft 40, a communication unit 50, an upstream side position detection sensor 71, a downstream side position detection sensor 72, and a controller 60 as a control unit.

The printing mechanism 10 includes a head unit 11 and a platen roller 12, performs printing on the print medium M, and feeds the continuous body ML and the ink ribbon R.

The head unit 11 holds a thermal head 13 with a heating element in the thermal head 13 exposed from a lower surface. The platen roller 12 is disposed immediately below the thermal head 13 and constitutes a printing unit 15 that performs printing on the print medium M with the thermal head 13.

The head unit 11 is swingably supported in the arrow direction in FIG. 1 by a support shaft 14. The head unit 11 can move to a head open position where the thermal head 13 is separated from the platen roller 12 and a head close position where the thermal head 13 abuts on the platen roller 12. In FIG. 1, the thermal head 13 is at the head close position.

The ribbon supply shaft 20 holds the ink ribbon R to be supplied to the printing unit 15 in a roll shape. The ink ribbon R supplied from the ribbon supply shaft 20 to the printing unit 15 is nipped between the thermal head 13 and the platen roller 12.

The medium supply shaft 40 holds the continuous body ML to be fed to the printing unit 15 in a roll shape. The continuous body ML fed from the medium supply shaft 40 to the printing unit 15 is nipped between the thermal head 13 and the platen roller 12 together with the ink ribbon R.

When the heating element in the thermal head 13 is energized with the print medium M and the ink ribbon R nipped between the thermal head 13 and the platen roller 12, the ink of the ink ribbon R is transferred onto the print medium M by the heat of the heat generating elements, thus the printing is performed on the print medium M. A positive rotation of the platen roller 12 by a platen driving motor (not illustrated) feeds the continuous body ML and the ink ribbon R to downstream.

The used ink ribbon R is rolled up to the outer periphery of the ribbon roll up shaft 30 when the ribbon roll up shaft 30 rotates due to engagement of gears with the platen drive motor. When the head unit 11 is in the head-open position, just the ink ribbon R can be fed by rotating the ribbon roll up shaft 30.

It should be noted that, while the printer 1 of the ink ribbon transfer type by the thermal head 13 will be described in this embodiment, the print medium M is a thermal paper, and the printer may be one using a thermal coloring system that prints onto the print medium M by applying heat from the thermal head 13.

The upstream side position detection sensor 71 includes a transmission type photoelectric sensor and a reflection type photoelectric sensor. In the case of the print medium M being the label or the wristband, eye marks for position detection are printed at predetermined intervals (pitches) on the continuous body ML in accordance with the print media M. The reflection type photoelectric sensor detects the eye mark to detect the relative position of the print medium M to the printing unit 15. The transmission type photoelectric sensor detects a clearance (gap) between the print medium M and the print medium M in the continuous body ML or a hole portion formed in the print medium M to detect the relative position of the print medium M to the printing unit 15.

The downstream side position detection sensor 72 includes the transmission type photoelectric sensor or the reflection type photoelectric sensor and detects the head position of the continuous body ML.

The upstream side position detection sensor 71 and the downstream side position detection sensor 72 are determined in relative positions with the position of the printing unit 15, more specifically, the position at which the thermal head 13 performs printing onto the print medium M and the position at which the platen roller 12 and the thermal head 13 are nipped the continuous body ML. the upstream side position detection sensor 71 and the downstream side position detection sensor 72 can detect the relative position of the print medium M with respect to the printing unit 15 by detecting the position of the print medium M. Accordingly, the eye marks for position detection, which are printed at the predetermined intervals (pitches) on the continuous body ML accordance with the print media M and the gaps between the print media M and the print media M in the continuous body ML, and the hole portions formed in the print media M are criteria for setting the position of the print medium M where the printing starts (printing start position).

To the controller 60 receives input of, via an input/output interface, printing command data from an external computer, detection signals from the upstream side position detection sensor 71 and the downstream side position detection sensor 72, and the like. The controller 60 controls the energization to the heating element in the thermal head 13, energization to respective driving motors, energization to a RFID antenna (not illustrated) in the communication unit 50, communications (reading, writing) with the IC chip in the print medium M having the RFID function, and the like.

When printing, the controller 60 executes the printing process in a state where the position of the print medium M to be printed is aligned with the printing start position, as illustrated in FIG. 1. The printing start position is set on the based on the position of the eye mark on the continuous body ML.

It should be noted that, to use the print medium M having the RFID function, the controller 60 performs printing on the print medium M and also reads information written to the IC chip having the RFID function and writes information to the IC chip by the communication unit 50 as necessary. It should be noted that, as described later, when the printer 1 is a model not equipped with the RFID function, the communication unit 50 is not provided.

Figure 2:
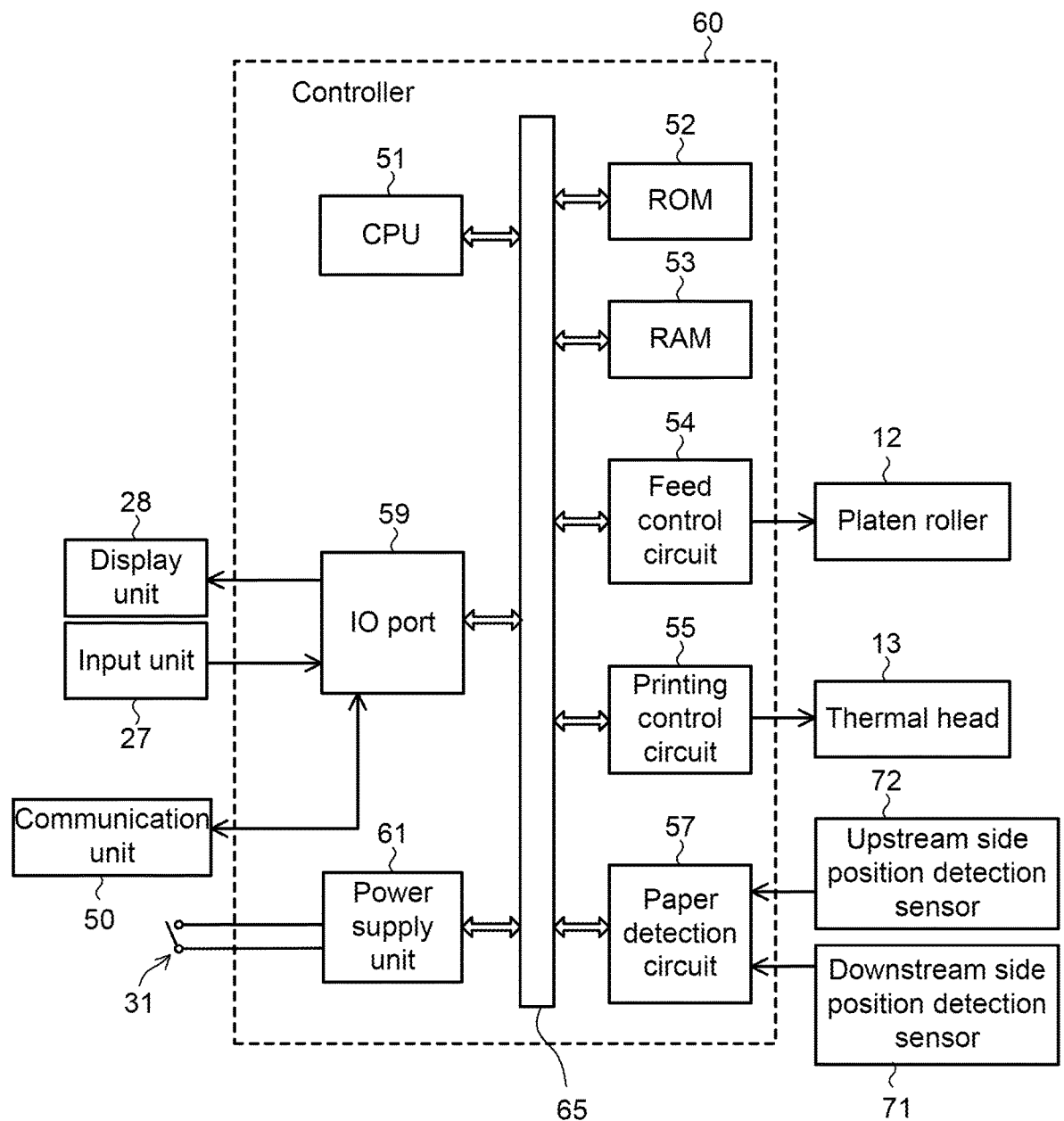
FIG. 2 is a control block diagram of the printer according to the embodiment of the present invention.

FIG. 2 is a configuration block diagram of the controller 60 according to this embodiment.

The controller 60 includes a CPU (central processing unit) 51, a ROM (read only memory) 52, a RAM (random access memory) 53, a feed control circuit 54, a printing control circuit 55, a paper detection circuit 57, an IO port 59, and a power supply unit 61. These components are interconnected via a bus 65, and are configured capable of sending and receiving various data to each other.

The CPU 51 executes a program stored in the ROM 52 to integrally control the whole controller 60 and cause the respective units to perform required processes and controls.

The ROM 52 stores the program read and executed by the CPU 51.

The RAM 53 stores various kinds of information required for the processes executed by the CPU 51, printing data, a printing format, and registration information required for printing, and the like.

The feed control circuit 54 controls a drive motor that drives the platen roller 12 in accordance with a instruction signal from the CPU 51, and controls the rotation/stop of the platen roller 12. This controls the feed of the continuous body ML on a paper feed path.

The printing control circuit 55 generates a printing signal corresponding to printing data, such as characters, figures, and barcodes to be printed, supplied from the CPU 51 and supplies the generated printing signal to the thermal head 13 to perform printing on the print medium M.

The paper detection circuit 57 detects a detection portion such as the eye mark and the gap provided in the continuous body ML on the paper feeding path on the basis of the information obtained by the upstream side position detection sensor 71 and the downstream side position detection sensor 72 and transmits the information to the CPU 51. The CPU 51 controls the feed of the continuous body ML and the ink ribbon R by the feed control circuit 54 on the basis of the information from the paper detection circuit 57 and controls a timing for printing with the thermal head 13 to perform printing on the appropriate position on the print medium M.

The IO port 59 is connected to a display unit 28 and an input unit 27 to output display data supplied from the CPU 51 to the display unit 28. The IO port 59 transmits an operation signal corresponding to an operation to the input unit 27 by a user to the CPU 51. The IO port 59 transmits and receives information with the communication unit 50 to read and write the data in the IC chip.

The display unit 28 is configured of, for example, a liquid crystal display. The input unit 27 is configured of a touch panel, a button, a DIP-SW, or the like provided with the display unit 28.

The power supply unit 61 monitors a press operation on a power supply switch 31 and performs switching between the execution and the stop of electric power supply to each unit based on the operation with the power supply switch 31 to turn on/off the power supply of the printer 1.

Next, the print medium M will be described. The printer 1 of this embodiment loads three types of the print media M, which are the label, the wristband, and the parent-child type wristband, and is configured to perform printing.

Figure 3:
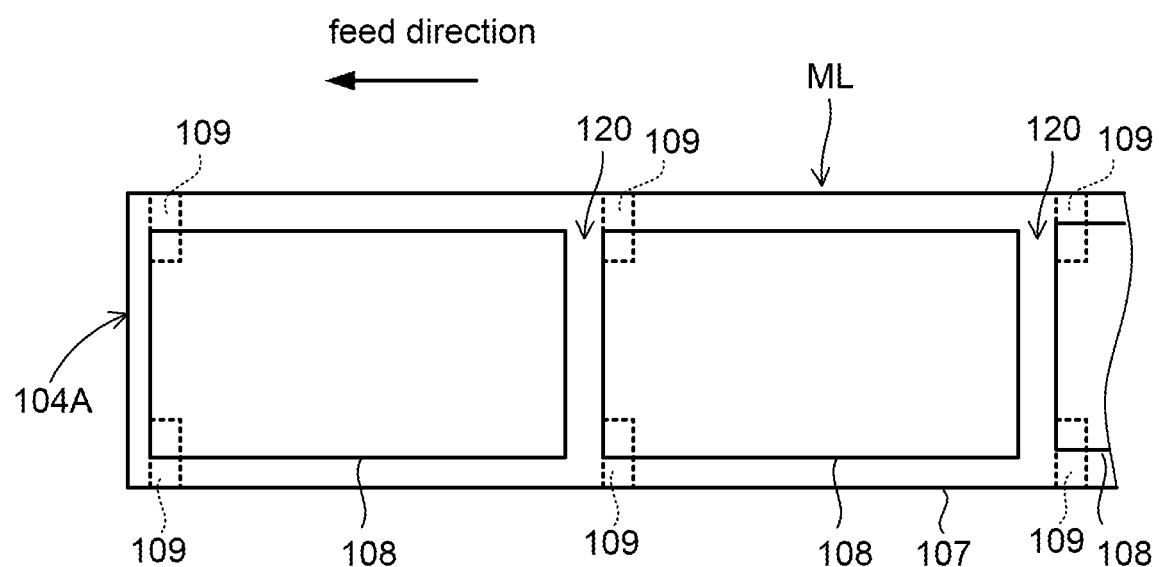
FIG. 3 is a plan view of a label.

FIG. 3 is a plan view describing the continuous body ML when the print medium M is the label.

The continuous body ML includes a strip-shaped liner sheet 107 and a plurality of label pieces 108 as the print media M temporarily adhered on the liner sheet 107.

On the back surface side of the liner sheet 107, eye marks 109 for position detection are preliminarily printed at positions equivalent to distal ends on the downstream sides in the feed direction of the label pieces 108. A gap 120 is provided between the label pieces 108 adjacent to one another.

The upstream side position detection sensor 71 detects the eye mark 109 provided on the continuous body ML or the gap 120 to ensure detecting the position of the label piece 108 (in more detail, a printed region) relative to the printing unit 15.

Figure 4:
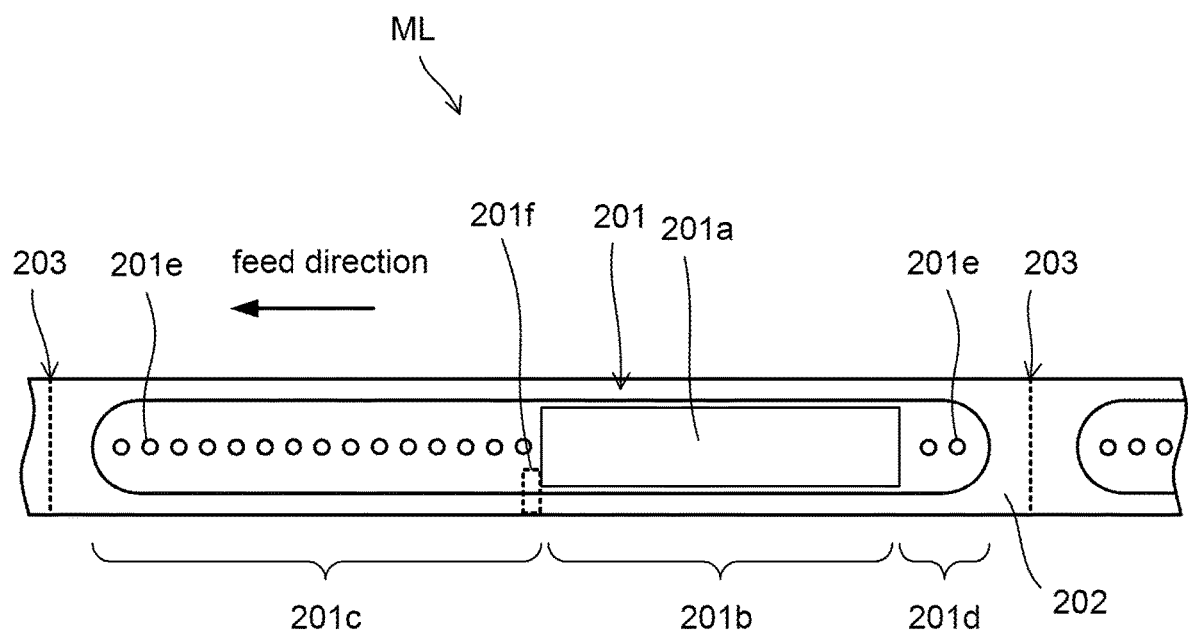
FIG. 4 is a plan view of a wristband.

FIG. 4 is a plan view describing the continuous body ML when the print medium M is the wristband.

On the continuous body ML, wristbands 201 formed by nicking a band base material 202 are arranged in the feed direction (longitudinal direction).

The wristband 201 includes a printed region 201a, a printed portion 201b, a first wound portion 201c, a second wound portion 201d, hole portions 201e, and an eye mark 201f.

The printed region 201a is a region on which printing is performed by the printing unit 15. The printed region 201a before printing is in a plain state. The printing is performed on the printed region 201a with the upper side in FIG. 4 as the upper side of printed contents.

The printed portion 201b includes the printed region 201a and is interposed between the first wound portion 201c and the second wound portion 201d.

The first wound portion 201c is formed to extend downstream in the feed direction from the printed portion 201b.

The second wound portion 201d is formed to extend upstream in the feed direction from the printed portion 201b. The second wound portion 201d has a length in the longitudinal direction shorter than the first wound portion 201c.

The hole portions 201e are formed to penetrate the first wound portion 201c and the second wound portion 201d. The hole portions 201e are secured by penetrating clips and the like when the wristband 201 is detached from the band base material 202 and attached to a wrist or the like. It should be noted that, in the example illustrated in FIG. 4, the 15 hole portions 201e are provided in the first wound portion 201c and the two hole portions 201e are provided in the second wound portion 201d.

The eye mark 201f is provided on the back surface side of the first wound portion 201c near (near the approximately center of the wristband 201) the distal end on the downstream side in the feed direction of the printed region 201a in the wristband 201. The eye mark 201f is preliminarily printed in black such that the reflection type photoelectric sensor, which is provided with the upstream side position detection sensor 71, can sense the eye mark 201f.

The eye mark 201f serves as a criterion to set the printing start position. That is, the detection of the eye mark 201f by the upstream side position detection sensor 71 allows detecting the position of the wristband 201 (in more detail, the printed region 201a).

A perforation 203 is formed at the boundary part between the wristband 201 and the wristband 201 on the continuous body ML so as to ensure easy cutting after printing.

Figure 5:
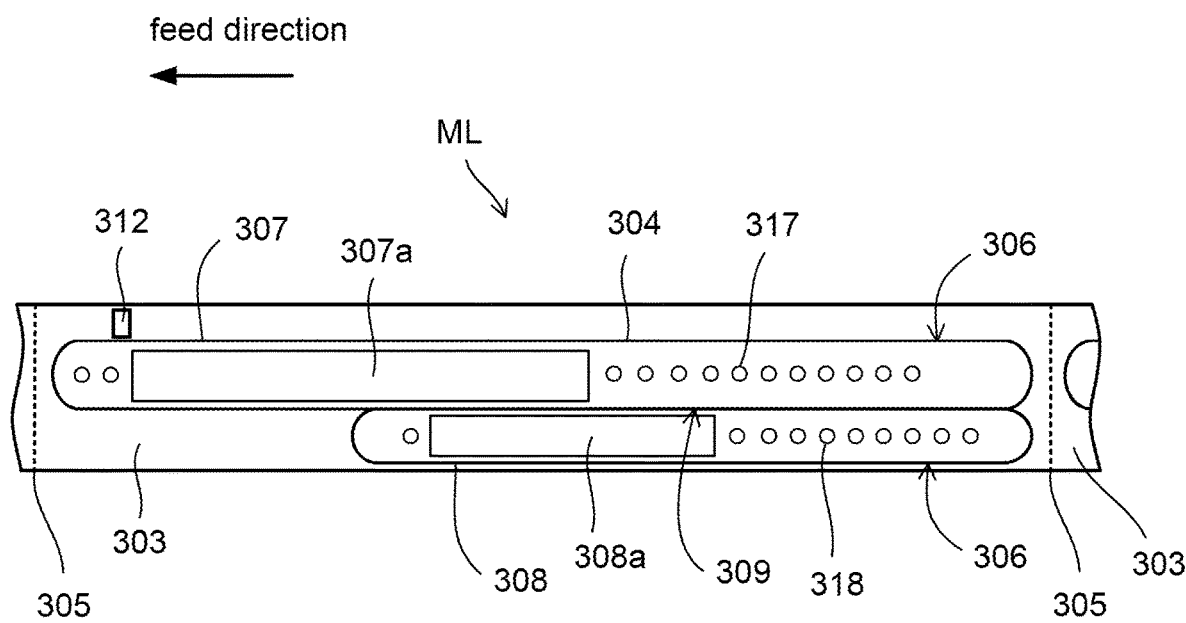
FIG. 5 is a plan view of a parent-child type wristband.

FIG. 5 illustrates a plan view of the continuous body ML when the print medium M is the parent-child type wristband.

In the continuous body ML, a parent-child type wristband 304 as one set of large and small wristbands (a parent wristband 307, a child wristband 308) that can be wound around a wound portion, such as a wrist and an ankle, and is formed by nicking a base material 303 is disposed.

Any materials appropriate for respective properties of the back surface side in contact with a human body and the front surface side where identification information is displayed are selectable as the materials of the base material 303 itself. However, a material that is flexible and excellent in air permeability is preferred for the back surface side, and a material on which printing can be performed is preferred for the front surface side, and a structure in which required base materials are stacked according to the respective functions can be employed.

The parent-child type wristband 304 is formed by integrating the parent wristband 307 and the child wristband 308 adjacent to one another via an inner edge boundary line 309. An outer edge boundary line 306 is a boundary line constituting the outer edge of the parent-child type wristband 304 to integrally separate the parent-child type wristband 304 from the base material 303 at the part of the outer edge boundary line 306. The inner edge boundary line 309 is a boundary line to separate the parent wristband 307 from the child wristband 308. These outer edge boundary line 306 and inner edge boundary line 309 can be easily separated.

The parent-child type wristband 304 is mainly used to reduce a mix-up of a baby at the time of birth. The parent-child type wristband 304 is attached to a mother first, and the child wristband 308 is separated from the parent-child type wristband 304 of the mother after the birth and is attached to the baby.

The parent wristband 307 includes a printed region 307a. The child wristband 308 includes a printed region 308a. The printed region 307a and the printed region 308a are regions on which printing is performed by the printing unit 15. The printed region 307a and the printed region 308a before printing are in a plain state. The printing is performed on the printed region 307a with the upper side in FIG. 5 as the upper side of printed contents.

The parent wristband 307 has a plurality of penetrating hole portions 317. Similarly, the child wristband 308 has penetrating hole portions 318. When the wristband is attached to a wrist or the like, clips or the like are penetrated through these hole portions 317, 318 for securing the wristband.

The base material 303 has a hole 312 formed in a rectangular shape. The hole 312 is disposed to be displaced in the width direction of the base material 303 from near the distal end on the downstream side in the feed direction of the printed region 307a in the parent-child type wristband 304 (a position slightly away from the distal end on the downstream side in the feed direction of the parent-child type wristband 304 to the upstream side in the feed direction, in another expression, a position slightly away from the distal end on the downstream side in the feed direction of the base material 303 to the upstream side in the feed direction) such that the transmission type photoelectric sensor provided with the upstream side position detection sensor 71 can sense the hole 312.

The hole 312 serves as a criterion to set the printing start position. That is, the detection of the rectangular hole 312 in the base material 303 by the transmission sensor in the upstream side position detection sensor 71 allows detecting the positions of the parent wristband 307 and the child wristband 308. This allows the upstream side position detection sensor 71 to detect the position of the parent-child type wristband 304 relative to the printing unit 15 (in more detail, the printed region).

Next, the label waste prevention function will be described.

Figure 6:
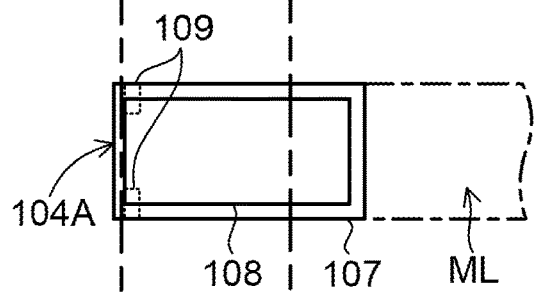
FIG. 6 is an explanatory view of a label waste prevention function according to the embodiment of the present invention.
Figure 6:
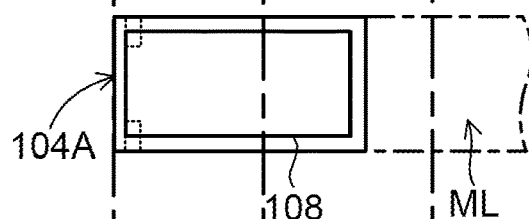
Figure 6:
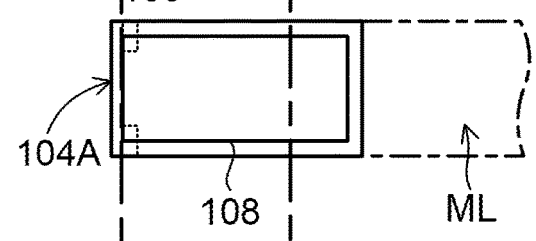
Figure 6:
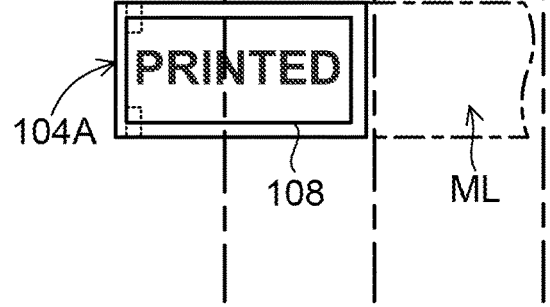
Figure 6:

FIG. 6 is an explanatory view of the label waste prevention function performed by the printer 1 of this embodiment.

The label waste prevention function is a function that can perform printing from the label at the distal end portion without making the label at the distal end portion waste when the continuous body ML is loaded on the printer 1 in the case where the print medium M is the label (see FIG. 3).

Typically, when the continuous body ML is loaded on the printer 1 to start printing, the controller 60 detects the position of the print medium M by the sensor while feeding the continuous body ML in the forward direction. In view of this, printing is not performed on the print medium M that has been fed in the downstream direction than the printing unit 15 at the detection, which is waste. The printer 1 of this embodiment performs the following operation to ensure printing from the print medium M at the distal end position of the continuous body ML.

In FIG. 6, (1) illustrates a state in which a distal end portion 104A of the continuous body ML is inserted up to the printing start position (the position where the distal end portion 104A is nipped between the platen roller 12 and the thermal head 13 of the printing unit 15).

In FIG. 6, (2) illustrates a state in which the downstream side position detection sensor 72 detects the distal end portion 104A of the continuous body ML.

In FIG. 6, (3) illustrates a state in which the continuous body ML is fed in the opposite direction and the position of the label piece 108 of the continuous body ML is matched with the printing start position of the printing unit 15.

In FIG. 6, (4) illustrates a state in which the printing has been performed on the head label piece 108.

To load the continuous body ML, the head is released (the head open position), and the distal end portion 104A of the continuous body ML is inserted up to the part of the platen roller 12. The operation of the controller 60 as follows in the state achieves the label waste prevention function.

The rotation of the platen roller 12 in the state where the continuous body ML is nipped between the thermal head 13 and the platen roller 12 (FIG. 6 (1)) feeds the continuous body ML in the direction of the downstream side position detection sensor 72 beyond the platen roller 12.

When the continuous body ML is fed and the downstream side position detection sensor 72 detects the distal end portion 104A of the print medium M at the distal end position of the continuous body ML (FIG. 6 (2)), the controller 60 performs a reverse rotation operation on the platen roller 12 and feeds the continuous body ML to the upstream side to stop the continuous body ML at the printing start position of the printing unit 15 (FIG. 6 (3)). Since a distance between the downstream side position detection sensor 72 and the printing unit 15 is mechanically determined at the fixed length, feeding the continuous body ML by the fixed length allows stopping the print medium M at the printing start position. In the state, the controller 60 performs printing by the printing unit 15 (FIG. 6 (4)).

This operation allows printing on the label piece 108 at the distal end position of the continuous body ML and even one label piece 108 on the loaded continuous body ML does not become waste.

Next, the operation of the printer 1 configured as described above will be described.

First, "medium profile function" and "medium start-up function" will be described. The medium profile function is a function that preliminarily stores a plurality of pieces of registration information (also referred to as "presets") corresponding to a plurality of types of the print media M and displays the stored presets with icons and the like as described in FIG. 7 to ensure calling the presets in a single operation.

The use of the medium profile function allows calling the registration information in the single operation even when the print medium M loaded on the printer 1 has been changed to another type. This eliminates the need for configuring settings for printing from the beginning again each time the type of the print medium M is changed.

Meanwhile, the medium start-up function is a mode that stores only one piece of registration information including one set of a plurality of printing setting items used for printing. In a case where the printer 1 is used for an application in which a plurality of types of the print media M are not frequently switched, some users feel that selecting an icon displayed in a start screen in each printing is burdensome. Therefore, the medium start-up function stores only one piece of registration information for each printing setting item to ensure omitting the operation for calling the registration information at start-up and at exchange of the print medium M.

Figure 7:
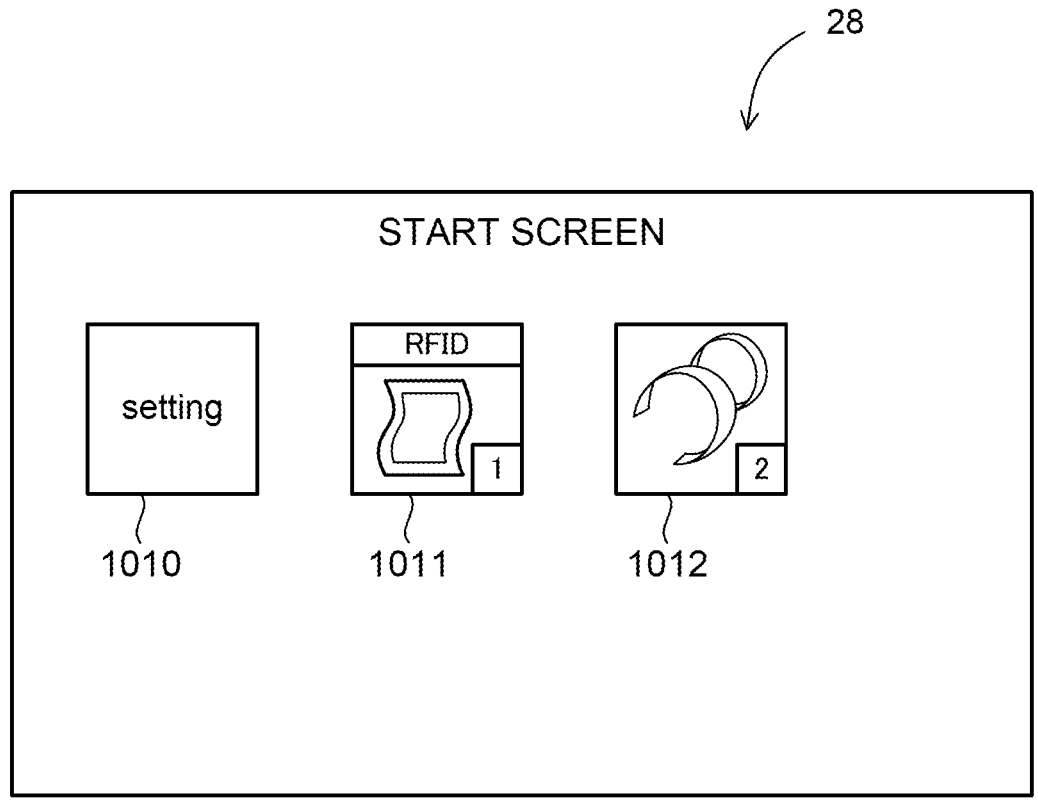
FIG. 7 is an explanatory view of an example of a start screen according to the embodiment of the present invention.

FIG. 7 is an explanatory view illustrating a screen regarding the medium profile function as one example of the start screen displayed in the display unit 28 of the printer 1 according to this embodiment.

The screen displays icons. The icons include a setting icon 1010 and registered icons 1011, 1012. As described later, the registered icons are icons corresponding to the registration information including the printing setting items registered by the medium profile function. In the example illustrated in FIG. 7, the registered icon 1011 for setting the label having the RFID function as the print medium M and the registered icon 1012 for setting the parent-child type wristband as the print medium M are displayed. It should be noted that, in the example illustrated in FIG. 7, the registered icon 1011 is displayed when the label having the RFID function has been registered as the print medium M and characters indicative of having the RFID function are given at the upper side of the icon. Additionally, numbers are given as 1, 2 . . . in the order of the registration of the printing setting at the lower right of these icons.

When the user starts the printer 1 and selects the registered icon, the registration information corresponding to the selected registered icon can be read and the printing can be appropriately performed on the print medium M corresponding to the read registration information.

It should be noted that, in a case where the printing setting has been registered using the medium start-up function, the registered icon is not displayed. In this case, printing can be performed on the print medium M without selecting the icon.

Next, a registration process of the printing setting performed by the controller 60 will be described.

The printer 1 performs the registration process as a sequence of procedures that sequentially obtains the information corresponding to the plurality of printing setting items and stores them as the registration information.

In the registration process, the controller 60 sequentially displays display screens promoting the input of the printing setting items in the display unit 28, and the user inputs the information of the printing setting items via the input unit 27. Through the sequence of operations, the registration information including pieces of the information corresponding to the respective printing setting items as one set is generated.

Figure 8:
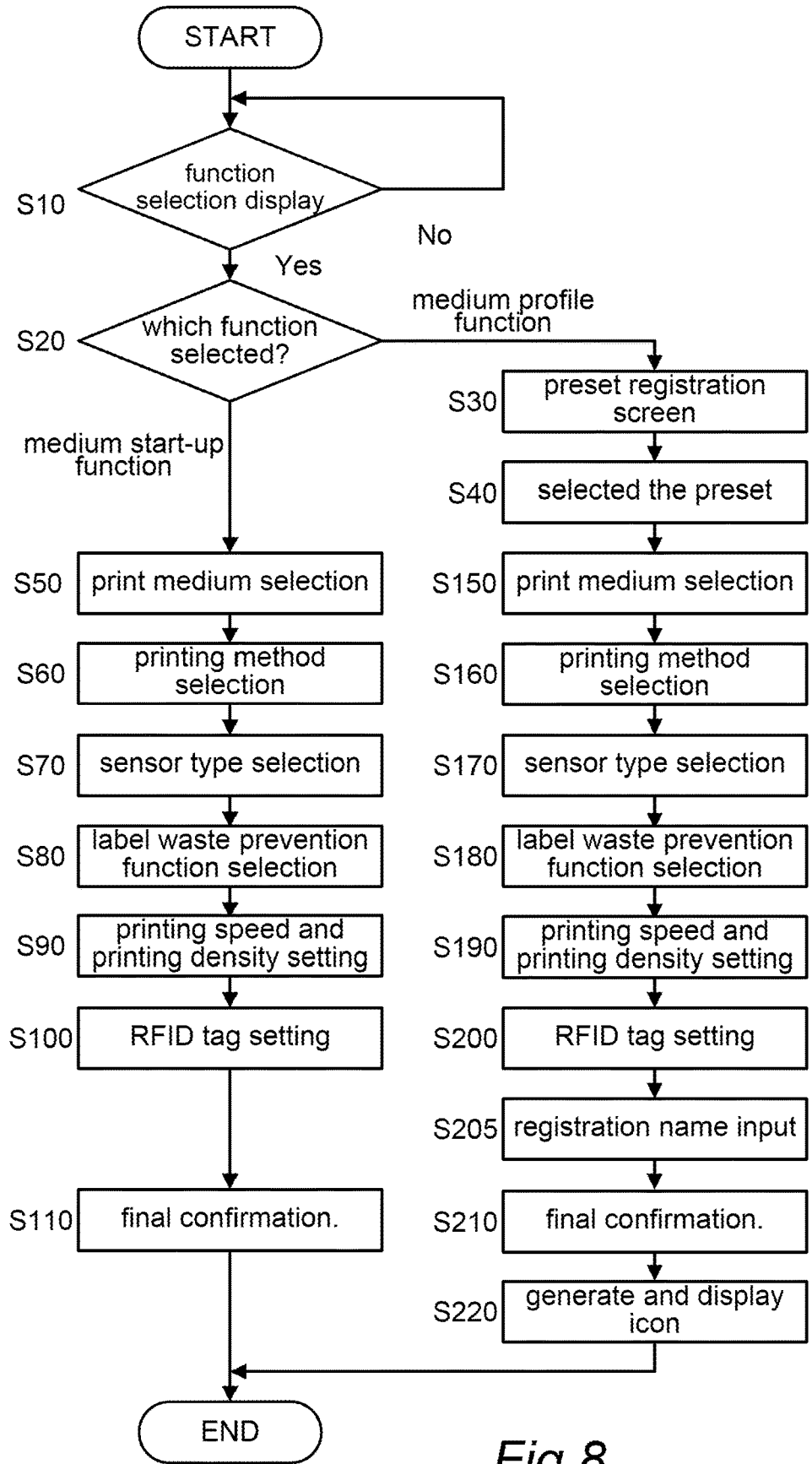
FIG. 8 is a flowchart for a registration process performed by a controller according to the embodiment of the present invention.

FIG. 8 is a flowchart depicting the registration process performed by the controller 60.

The flowchart depicted in FIG. 8 is performed by reading the program stored in a storage device by the controller 60.

Figure 9:
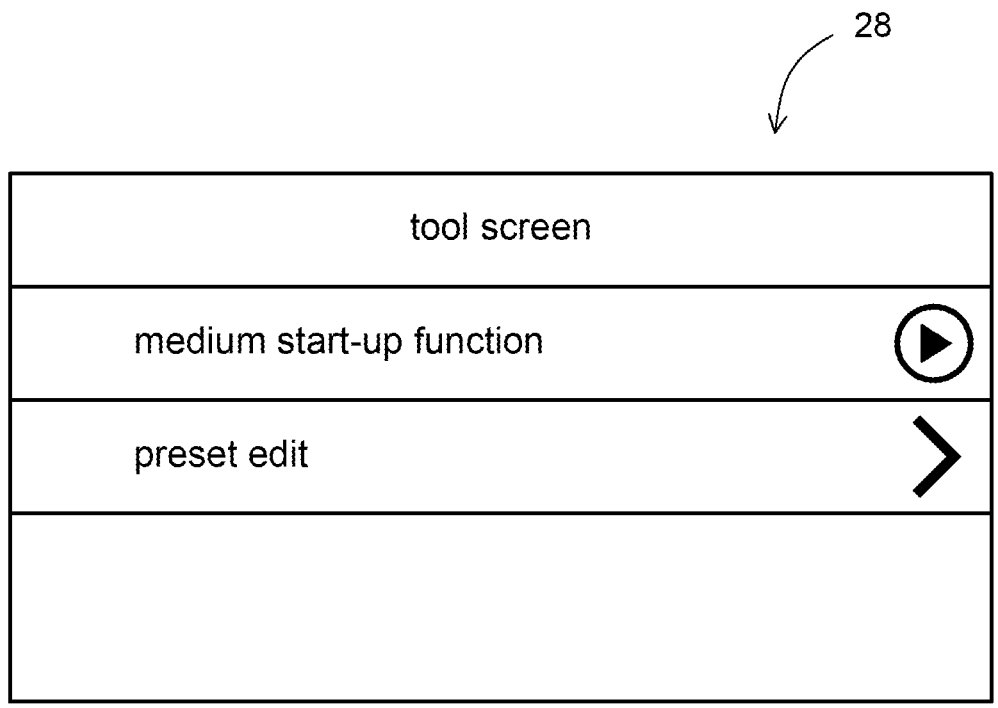
FIG. 9 is an explanatory view of an example of a setting screen according to the embodiment of the present invention.

The controller 60 displays a tool screen (see FIG. 9) to input whether to perform the registration by the medium start-up function or perform the registration by the medium profile function in the display unit 28 and performs a function selection display process to stand by for the input by the user (Step S10).

The controller 60 determines whether the user has selected the medium start-up function or the medium profile function (Step S20).

When it is determined that the medium profile function has been selected, the process transitions to Step S30. When the medium start-up function has been selected, the process transitions to Step S50.

Figure 10:
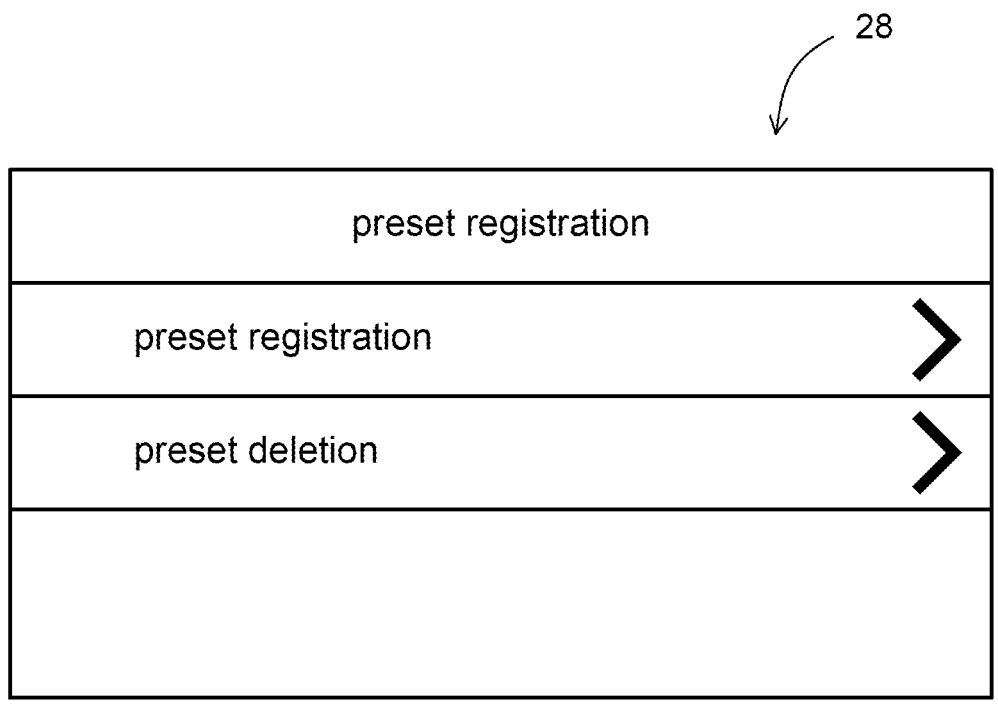
FIG. 10 is an explanatory view of an example of a preset registration screen according to the embodiment of the present invention.

At Step S30, the controller 60 displays a preset registration screen (see FIG. 10). The preset registration screen includes menus for preset registration and preset deletion.

Figure 11:
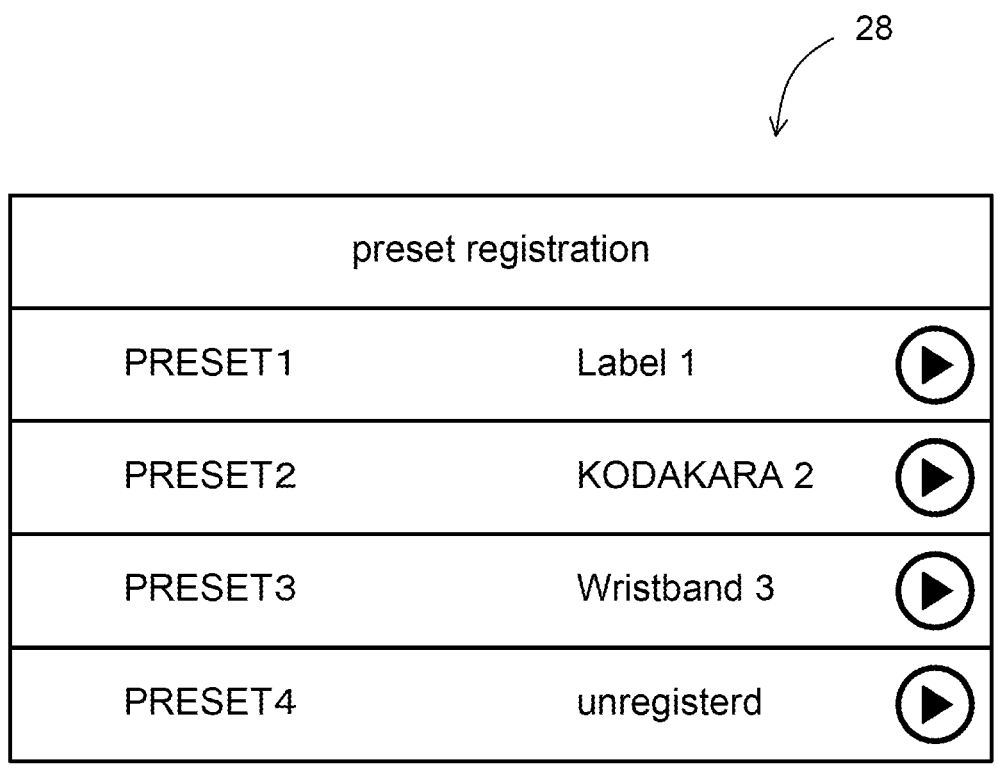
FIG. 11 is an explanatory view of an example of a preset list screen according to the embodiment of the present invention.

When the user has selected the preset registration, the controller 60 transitions the process to Step S40, displays a registered or unregistered preset list, and stands by for the selection of the preset by the user (see FIG. 11).

When the user has selected the unregistered preset, the controller 60 sequentially obtains the printing setting items described at and after Step S150. When the medium start-up function has been selected at Step S20, the printing setting items described at and after Step S50 are sequentially obtained. It should be noted that, process contents of the processes at and after Step S50 and the processes at and after Step S150 are mostly common between the case where the medium start-up function has been selected and the case where the medium profile function has been selected.

First, the processes from Step S50 to Step S110 when the medium start-up function is selected will be described. Step S50 is the printing setting item for print medium setting among the sequence of the plurality of printing setting items. The controller 60 displays a print medium selection screen (see FIG. 12) to select the type of the print medium M and stands by for the selection of the print medium M by the user. When the user selects any of the print media M, the controller 60 stores the type of the selected print medium M and transitions the process to Step S60.

An example in which the printer 1 according to this embodiment can select the print medium M from three types of the print media M, the label, the wristband, and the parent-child type wristband will be described. These print media M differ in the printing start position each using the eye mark or the hole formed in the base material as the criterion. Especially, since the wristband and the parent-child type wristband include a band portion, their printing start positions are away from the head position than that of the label. The controller 60 controls the feed of the print medium M according to the type of the print medium M selected at Step S50.

Figure 12:
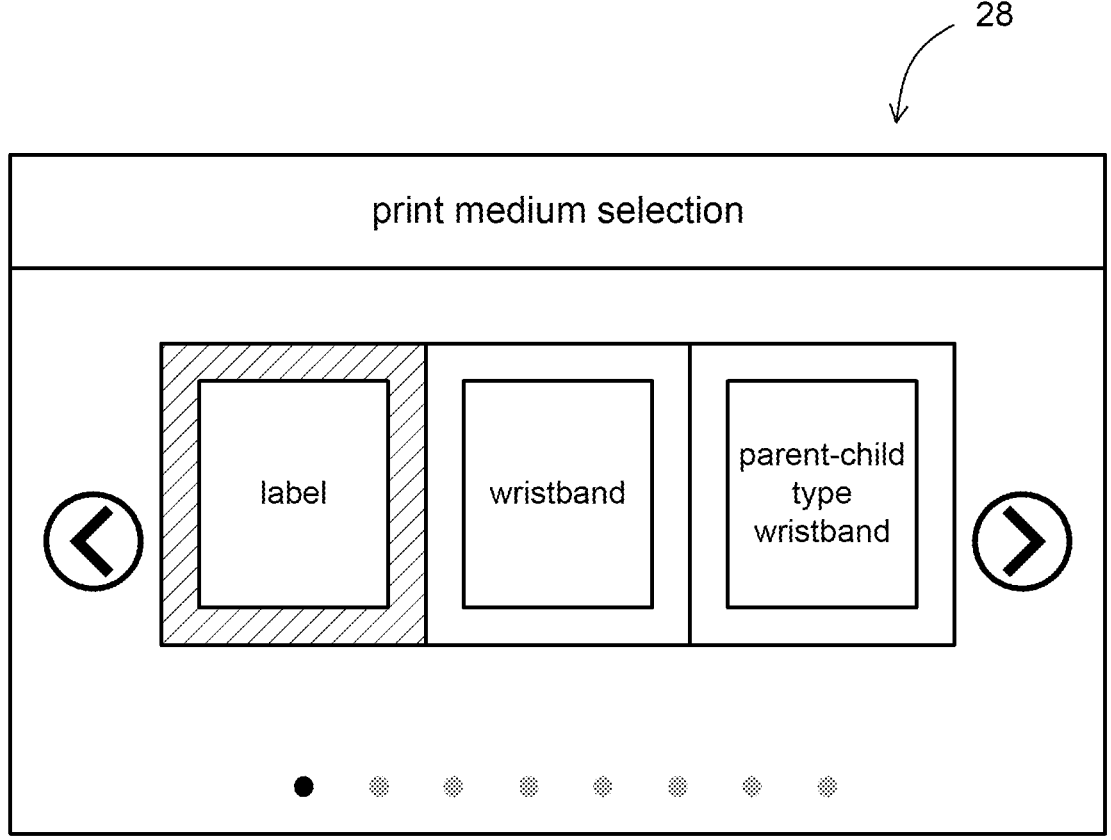
FIG. 12 is an explanatory view of an example of a print medium selection screen according to the embodiment of the present invention.
Figure 13:
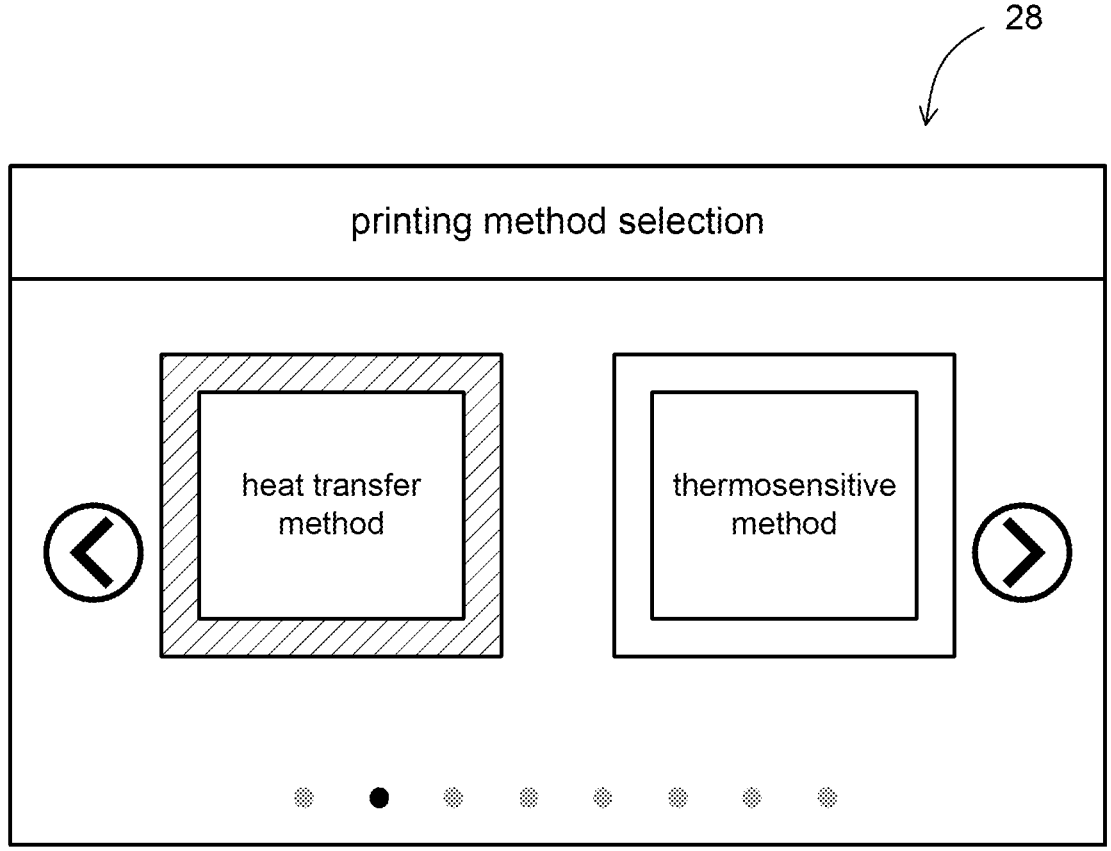
FIG. 13 is an explanatory view of an example of a printing method selection screen according to the embodiment of the present invention.

In the print medium selection screen of FIG. 12, the controller 60 displays a state in which "label" is selected (indicated by hatching) as the first item (or the recommended item) as the initial screen. When the user selects the wristband or the parent-child type wristband, the item is in the selected state (hatched). In the print medium selection screen of FIG. 12, a plurality of points illustrated on the lower side of the drawing indicate the number of the plurality of printing setting items required for the registration of the registration information and the current position. The position illustrated by the dark point is the position of the current printing setting item among the plurality of printing setting items. The arrows illustrated to the right and the left in the print medium selection screen indicate buttons operated by the user for transition to the next printing setting item. These screen displays are common from FIG. 12 to FIG. 19.

Step S60 is the printing setting item for printing method setting. The controller 60 displays the printing method selection screen (see FIG. 13) to select the printing method and stands by for the selection of the printing method by the user. When the user has selected any of the printing methods, the controller 60 stores the selected printing method and the process transitions to Step S70.

It should be noted that, Step S60 is performed when the printer 1 has a plurality of printing methods (the heat transfer method, a thermosensitive method). When not, that is, when the printer 1 has only the heat transfer method, the controller 60 may omit the process of Step S60 and the process transitions to Step S70.

More specifically, two types of the printers 1 are present, a model dedicated to a thermosensitive method having only the thermosensitive method and a model doubling as a thermosensitive method/heat transfer method that has both of the thermosensitive method and the heat transfer method. The model dedicated to the thermosensitive method does not have a mechanism related to the ink ribbon R. Therefore, when the printer 1 is the model dedicated to the thermosensitive method, a printing method selection screen at Step S60 is not displayed but the process transitions to a sensor type selection screen at Step S70, thus ensuring reducing a labor of the user at the printing setting.

It should be noted that, whether the controller 60 in the printer 1 is compatible with the model dedicated to the thermosensitive method or compatible with the model doubling as the thermosensitive method/heat transfer method may be preliminarily configured by the DIP-SW, which is provided with the input unit 27, at a manufacturing factory of the printer 1. When the controller 60 obtains the setting of the DIP-SW and determines that the printer 1 is the model dedicated to the thermosensitive method, the process of Step S60 is omitted. When the controller 60 determines that the printer 1 is the model doubling as the thermosensitive method/heat transfer method, the controller 60 performs the process of Step S60, displays the printing method selection screen (see FIG. 13), and stands by for the selection of the printing method by the user.

Step S70 is the printing setting item for sensor type selection. The controller 60 displays the sensor type selection screen (see FIG. 14A) to select the sensor type and stands by for the selection of the sensor type by the user. When the user selects any of the sensor types, "Disable," "Transmission," and "Reflection," the controller 60 stores the selected sensor type and the process transitions to Step S80.

As described above, the upstream side position detection sensor 71 includes the two types of sensors, the transmission sensor and the reflection sensor. The transmission sensor detects the clearance (gap) between the print medium M and the print medium M in the continuous body ML or the hole portion formed in the print medium M. The reflection sensor detects the eye mark printed on the continuous body ML.

Figure 14A:
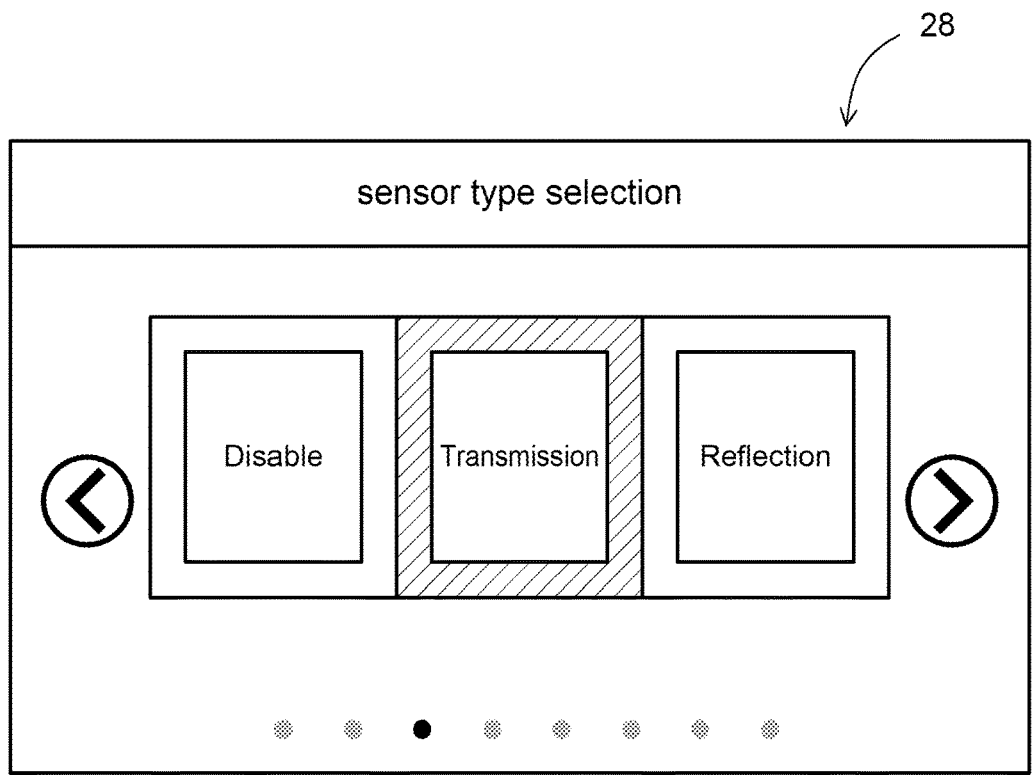
FIG. 14A is an explanatory view of an example of a sensor type selection screen according to the embodiment of the present invention.
Figure 14B:
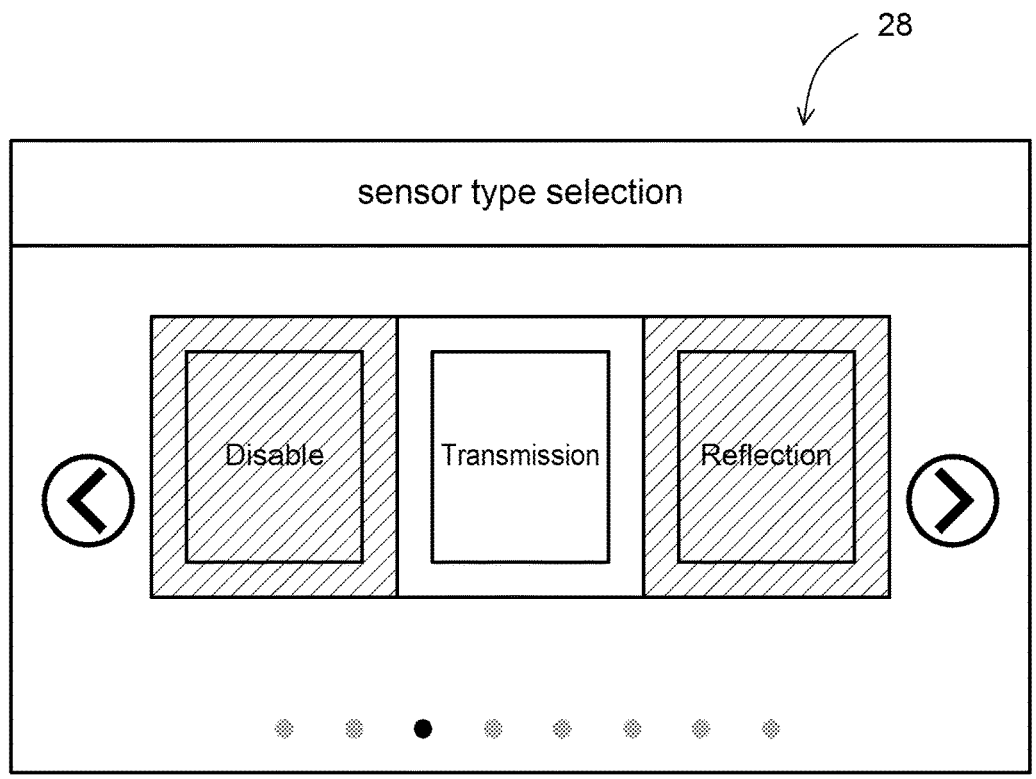
FIG. 14B is an explanatory view of an example of the sensor type selection screen according to the embodiment of the present invention.
Figure 15:
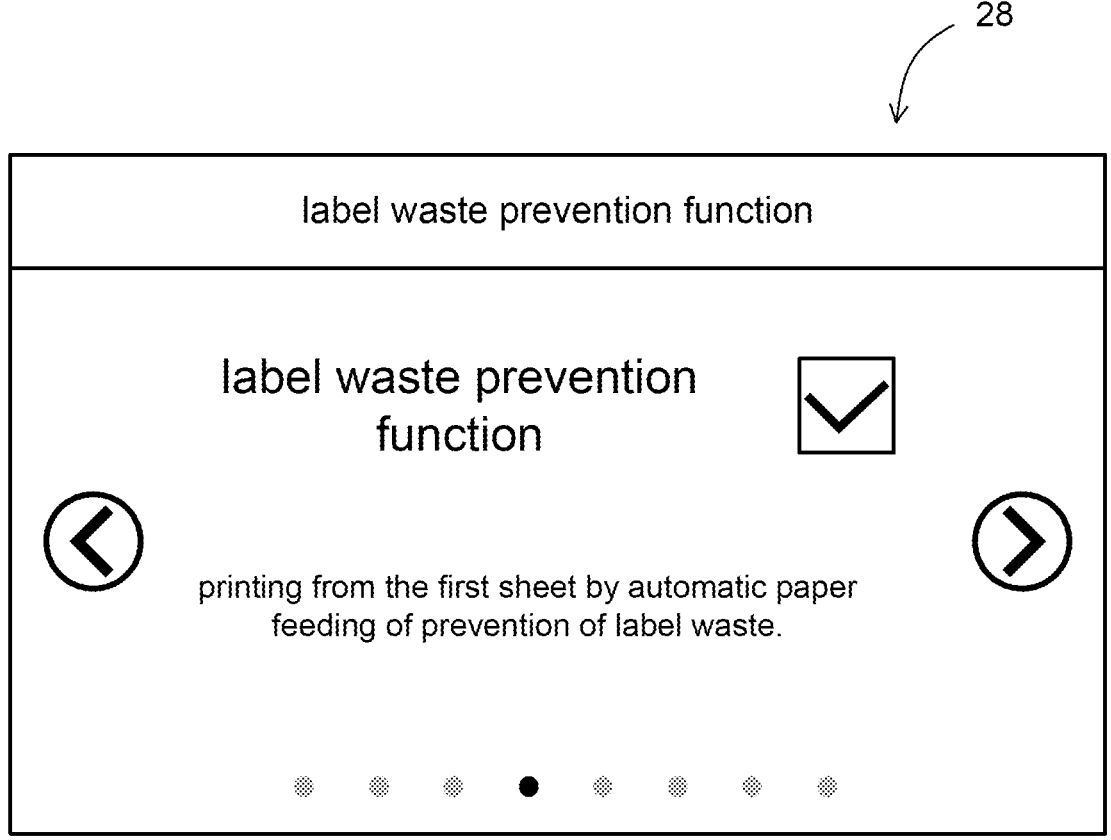
FIG. 15 is an explanatory view of an example of a label waste prevention function selection screen according to the embodiment of the present invention.
Figure 16:
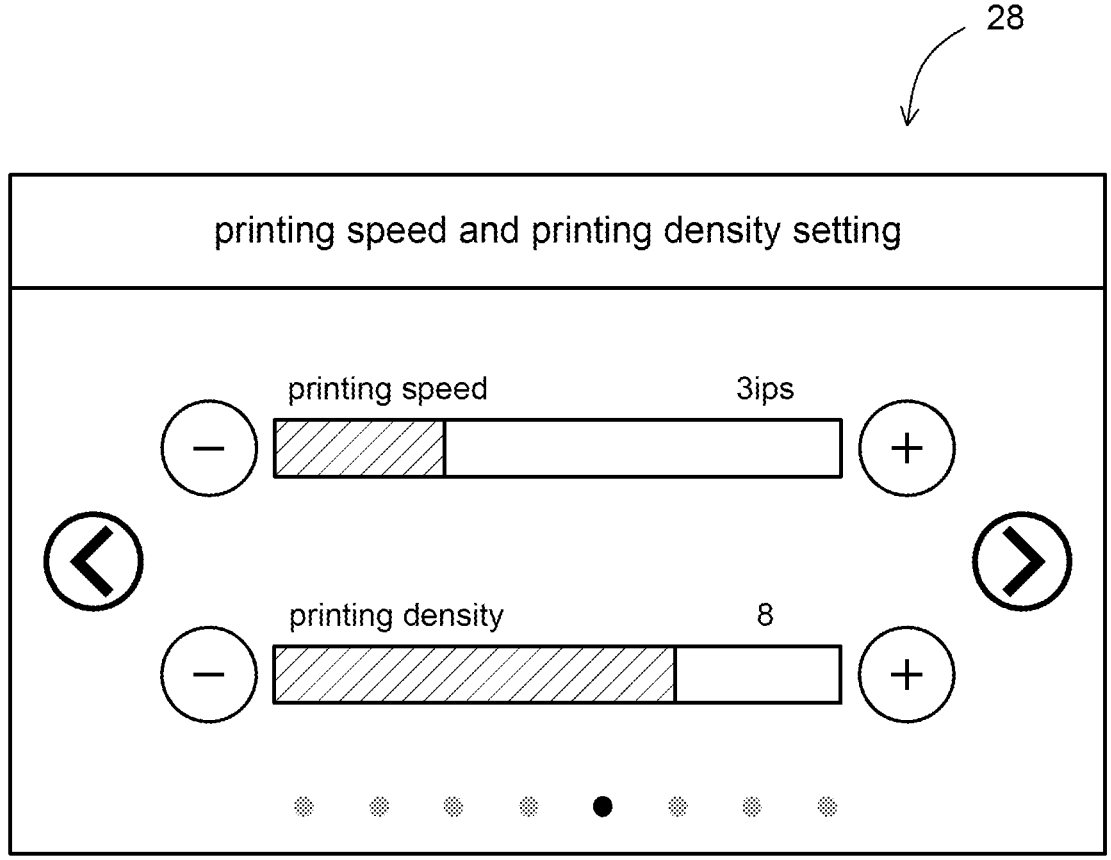
FIG. 16 is an explanatory view of an example of a printing speed and density setting screen according to the embodiment of the present invention.

In this embodiment, when the print medium M is the label and the wristband, the eye mark is printed. The eye mark is not printed on the parent-child type wristband, but the rectangular hole 312 is formed. That is, the detection method of the printing position differs depending on the type of the print medium M. Therefore, when the parent-child type wristband is selected at Step S20, as illustrated in FIG. 14B, the controller 60 allows only the selection of the transmission sensor and the other selection items cannot be selected (are grayed out, for example).

It should be noted that, when the control of the printing position of the print medium M is unnecessary, the sensor type can be set to be disabled. In this case, the process of Step S80 described below may be omitted and the process transitions to Step S90.

Step S80 is the printing setting item for whether to enable the label waste prevention function. The controller 60 displays a label waste prevention function selection screen (see FIG. 15) to select whether to enable or disable the label waste prevention function and stands by for an operation of a check button to select whether to enable or disable the label waste prevention function by the user. When the user selects "Enable" or "Disable," the controller 60 stores it and the process transitions to Step S90.

It should be noted that, the label waste prevention function may be enabled only when the print medium M is the label. When the print medium M is the wristband, the print medium M also includes the wound portions 201c, 201d in addition to the printed region 201a, and therefore the printing start position is at the approximately close to the center, not near the distal end portion of the wristband. Therefore, this is because, in the case where the label waste prevention function is set to be enabled, when the print medium M is fed to the upstream side by the fixed length (the distance between the downstream side position detection sensor 72 and the printing unit 15) after the downstream side position detection sensor 72 detects the head position of the continuous body ML similarly to the case of the label, the printing start position is not matched with the printed region.

Similarly, in the parent-child type wristband as well, the printing start position is at the position slightly away from the distal end of the parent-child type wristband 304 in the upstream side in the feed direction. Therefore, this is because, in the case where the label waste prevention function is set to be enabled, when the print medium M is fed to the upstream side by the fixed length (the distance between the downstream side position detection sensor 72 and the printing unit 15) after the downstream side position detection sensor 72 detects the head position of the continuous body ML similarly to the case of the label, the printing start position is not matched with the printed region. Alternatively, in a case where the label waste prevention function is set to be enabled to solve the problem, the printing start position may be matched with the printed region by performing a different feed control according to the type of the print medium M.

Therefore, in a case where the wristband or the parent-child type wristband is selected at Step S50, the controller 60 may omit the process of Step S80 and the process may transition to Step S90.

Step S90 is the printing setting items for printing speed and printing density setting. The controller 60 displays a printing speed and printing density setting screen (see FIG. 16) and stands by for the settings of the printing speed and the printing density by the user. When the value is changed, the controller 60 stores it and the process transitions to Step S100.

It should be noted that, the controller 60 may preliminarily store recommended values corresponding to the type of the print medium M and may display the recommended values (the printing speed: 3ips, the printing density: 8) corresponding to the print medium M selected at Step S50 in the display unit 28. The user can operate the "−" button or the "+" button shown in the printing speed and printing density setting screen only when fine adjustment is required to change these values.

Step S100 is the printing setting item for RFID tag setting. The controller 60 displays a RFID tag setting screen (see FIG. 17) to set the type of the RFID tag and stands by for the selection of the RFID tag by the user. When the user selects any of the RFID tags, the controller 60 stores the type of the selected RFID tag and the process transitions to Step S110.

Figure 17:
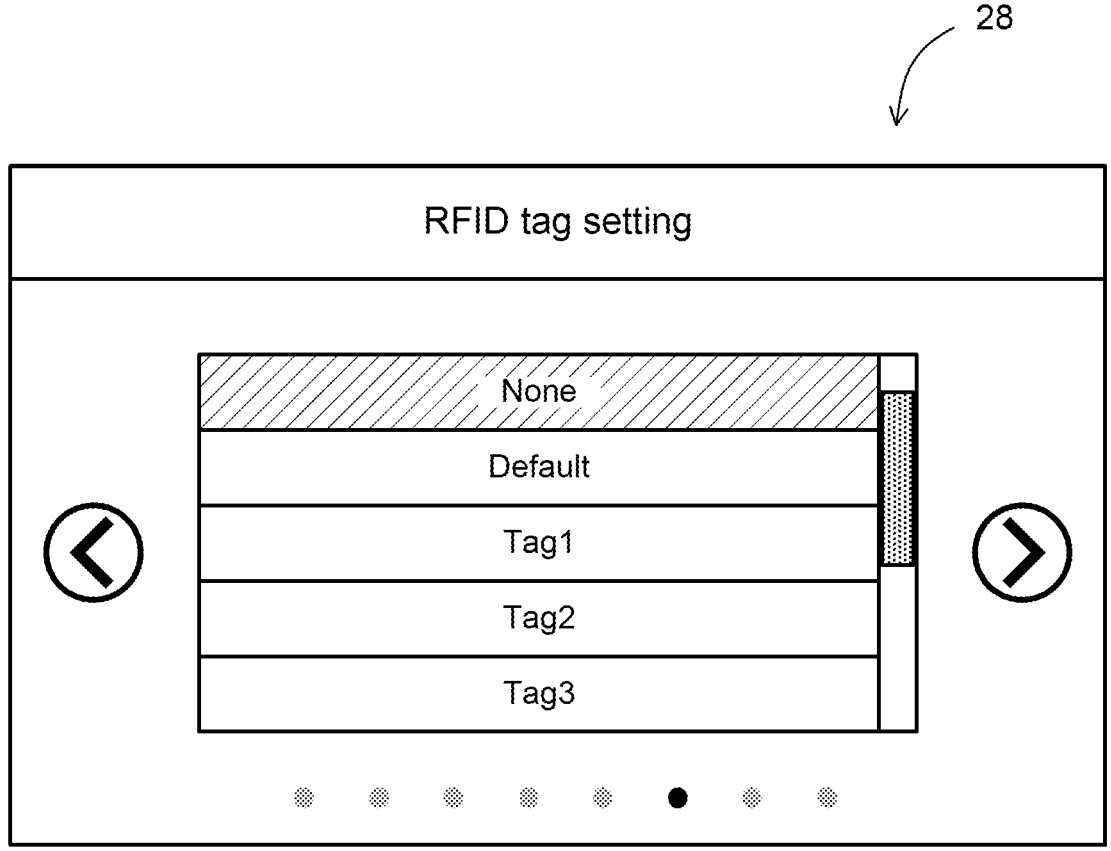
FIG. 17 is an explanatory view of an example of a RFID tag setting screen according to the embodiment of the present invention.

With reference to FIG. 17, "None" is selected when the RFID tag is not used. To select the default value of the RFID tag, select "Default." As the default values, default values (initial values) of an antenna position corresponding to the RFID tag, information on a radio wave output read from the RFID tag, and information on a radio wave output written to the RFID tag are registered. The controller 60 sets the antenna position and radio field intensity based on the information.

The RFID tag setting screen shows other respective setting values of the RFID tag "Tag1," "Tag2," and "Tag3" . . . to be selectable. Since the optimum antenna position and radio field intensity differ depending on the type of the print medium M including the RFID tag, each of the setting values according to the types of the print medium M and the RFID can be registered. For example, with the print medium M set to the printing unit 15, the controller 60 can perform a detection process that detects the antenna position and the radio field intensity optimum for the RFID tag in the print medium M. The results of this detection process are registered in "Tag1," "Tag2," and "Tag3" ... as the setting values, and the reading from and the writing to the RFID tag can be performed using the registered setting values. It should be noted that, "Tag1," "Tag2," and "Tag3" can be changed to any names and registered.

It should be noted that, the printing setting item for RFID tag setting described at Step S100 is performed when the printer 1 has the RFID function. When not, that is, when the printer 1 does not have the RFID function, the controller 60 may omit the process of Step S100 and the process may transition to Step S110.

More specifically, two types of the printers 1, a model equipped with the RFID function, which has the RFID function, and a model not equipped with the RFID function, which does not have the RFID function, are present. These models are configured as options at factory shipping. The model equipped with the RFID function includes the communication unit 50 between the printing unit 15 and the upstream side position detection sensor 71. The communication unit 50 includes a RFID antenna that performs reading and writing of the RFID tag and its control device. When the printer 1 is the model not equipped with the RFID function, which does not have the RFID function, the RFID tag setting screen at Step S100 is not displayed, and the process transitions to a setting screen for registration name input at Step S110, thus ensuring reducing a labor of the user at the printing setting.

Whether the printer 1 is the model equipped with the RFID function or the model not equipped with the RFID function is determined by whether the communication unit 50 being coupled to the IO port 59 in the controller 60 via communication cable at the manufacturing factory of the printer 1. That is, when the communication unit 50 is coupled, the controller 60 obtains a signal via the communication cable and determines that the printer 1 is the model equipped with the RFID function. When the printer 1 is determined as the model equipped with the RFID function, the process of Step S100 is performed, the RFID tag setting screen (see FIG. 17) is displayed, and the controller 60 stands by for the RFID tag setting by the user. When the communication unit 50 is not coupled, since the controller 60 does not obtain the signal from the communication unit 50, the controller 60 determines that the printer 1 is the model not equipped with the RFID function and omits the process of Step S100.

Step S110 is the printing setting item for final confirmation. A final confirmation screen promoting the confirmation of the printing settings stored at the processes from Steps S50 to S100 is displayed, and the controller 60 stands by for the final confirmation by the user. When the user operates the Register button, the controller 60 generates and stores the registration information.

The final confirmation screen displays the list of the information of the already set printing setting items included in the registration information. The user can confirm the contents of the registration information in the final confirmation screen.

Next, a process when the medium profile function is selected at Step S20 will be described. As described above, when the controller 60 determines that the medium profile function has been selected, the controller 60 displays the preset registration screen at Step S30. When the unregistered preset has been selected at Step S40, the processes from Step S150 to Step S220 are performed and the printing setting items are sequentially obtained.

The processes from Step S150 to S200 are common to the processes from Step S50 to Step S100 in the medium start-up function. That is, each Step S150 and Step S50, Step S160 and Step S60, Step S170 and Step S70, Step S180 and Step S80, Step S190 and Step S90, and Step S200 and Step S100 are corresponded. After the setting process of the printing setting item of the RFID tag setting at Step S200, the process transitions to Step S205.

Step S205 is the printing setting item for registration name input. The controller 60 displays a registration name input screen (see FIG. 18A) to input the registration name of the printing settings stored by the above-described processes and stands by for the input of the registration name by the user. When the registration name is input, the controller 60 stores it and the process transitions to Step S210.

Figure 18A:
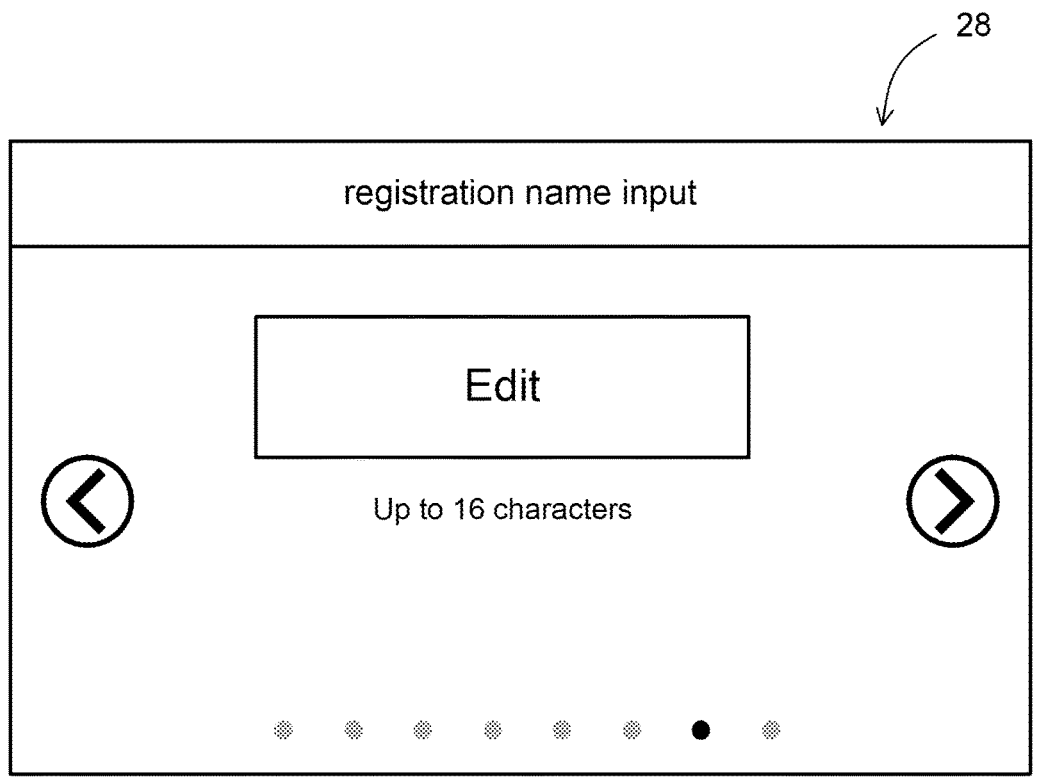
FIG. 18A is an explanatory view of an example of a registration name input screen according to the embodiment of the present invention.
Figure 18B:
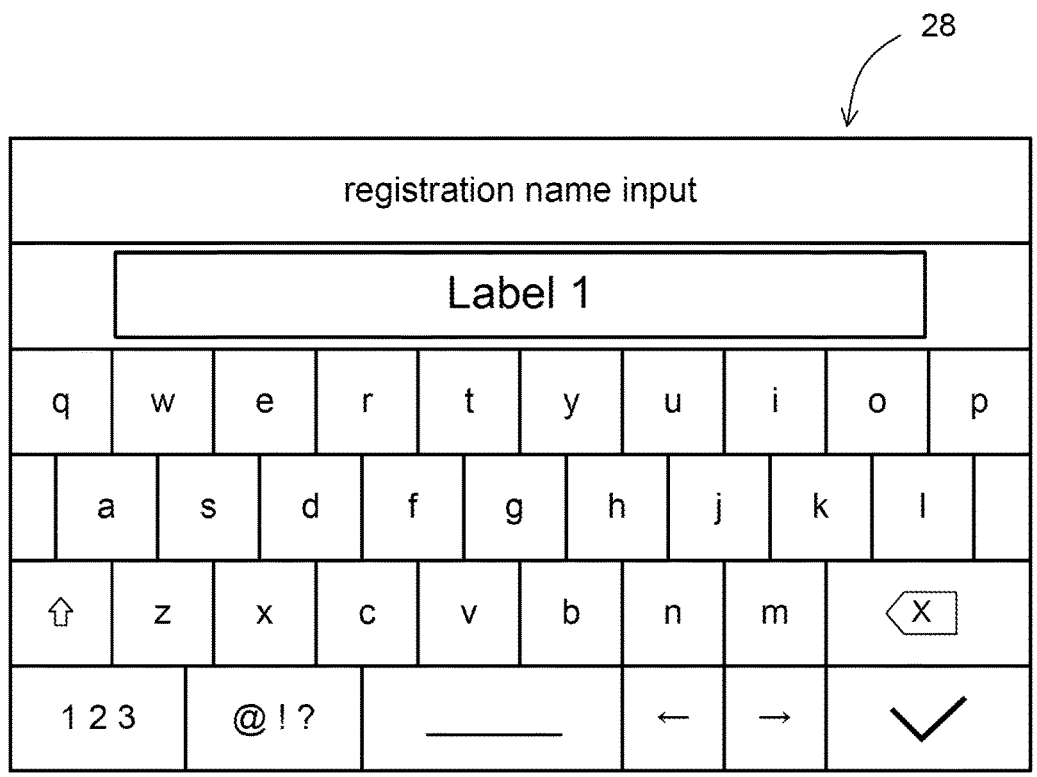
FIG. 18B is an explanatory view of an example of a registration name input screen according to the embodiment of the present invention.
Figure 19:
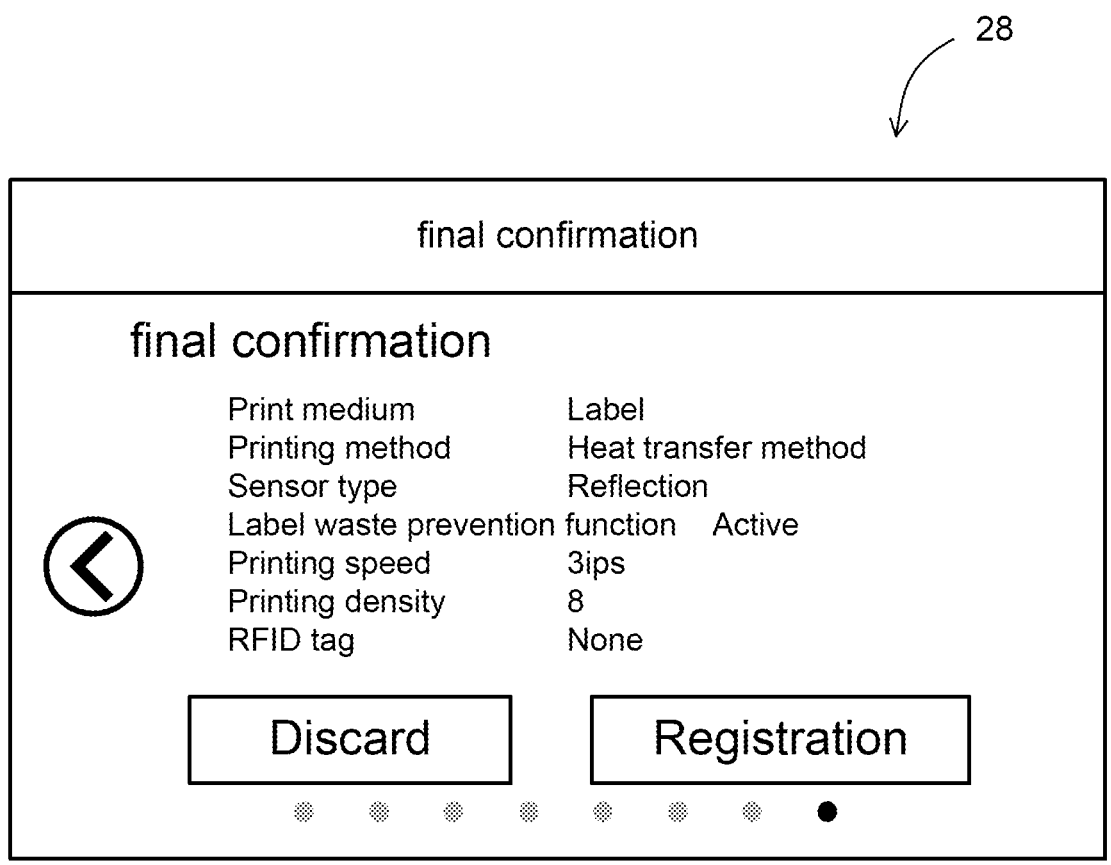
FIG. 19 is an explanatory view of an example of a final confirmation screen according to the embodiment of the present invention.

The "Edit" button is displayed in the registration name input screen illustrated in FIG. 18A. When the user operates this Edit button, the screen transitions to the input screen illustrated in FIG. 18B. This input screen displays the current registration name and a touch keyboard to input the registration name. In the input screen, the name corresponding to the print medium M stored at Step S20 is preliminarily set. For example, in the case of the print medium M being the label, "Label 1" is input as the initial value. A sequence of numbers is assigned for the registration names of the print media M of the same type. The user can change this registration name as necessary.

After the setting of the printing setting item for registration name input is completed, the controller 60 transitions to Step S210. The process of Step S210, which is similar to Step S110 described above, displays the final confirmation screen (see FIG. 19) promoting the confirmation of the printing settings stored in the processes from Step S150 to S200 and stands by for the final confirmation by the user. When the user operates the Register button, the controller 60 generates and stores the registration information. Afterwards, the process transitions to Step S220.

Next, the process of Step S220 will be described. When the controller 60 stores the registration information, the controller 60 generates the icons corresponding to the stored registration information, and displays the generated icons at the next display of the start screen (see FIG. 7).

By the above-described processes, the controller 60 sequentially obtains the information of the printing setting items via the input unit 27 from the user, the registration information corresponding to the print medium M selected at Step S50 or Step S150 is generated and stored in the storage device (RAM 53) in the controller 60.

As described above, according to this embodiment, the printer 1 that allows selection of the plurality of types of the print media M (the label, the wristband, and the parent-child type wristband) includes the controller 60 as the control unit that stores the plurality of pieces of registration information. The registration information includes one set of the plurality of printing setting items used for printing. The plurality of printing setting items includes the item regarding the type of the print medium M.

Accordingly, the plurality of pieces of registration information corresponding to the plurality of respective types of the print media M are preliminarily stored. Therefore, even when the user configures the setting before the start of printing and the print medium M is exchanged for a print medium M of a different type, the printing can be performed based on the stored registration information, thereby reducing a labor of the user and improving a convenience.

According to this embodiment, the plurality of types of the print media M have the respective different printing start positions. The controller 60 matches the position of the print medium M with the printing start position based on the setting of the item regarding the type of the print medium M.

According to this embodiment, the input unit 27 that receives the command from the user is provided. The controller 60 sequentially obtains the information corresponding to the plurality of printing setting items from the input unit 27 to generate the registration information, and omits obtaining the information on the printing setting items not corresponding to the print medium M set in the item regarding the type of the print medium M among the plurality of printing setting items.

According to this embodiment, the display unit 28 is provided. The controller 60 causes the display unit 28 to display the icon corresponding to the stored registration information.

According to this embodiment, the plurality of printing setting items include the item regarding the label waste prevention function.

According to this embodiment, the controller 60 has the medium profile function as a first mode that stores the plurality of pieces of registration information including one set of the plurality of printing setting items used for printing, and the medium start-up function as a second mode that stores only one piece of the registration information including one set of the plurality of printing setting items used for printing. Thus, the use of the medium profile function allows calling the registration information in the single operation even when the print medium M loaded on the printer 1 has been changed to another type. This eliminates the need for configuring the settings for printing from the beginning again each time the type of the print medium M is changed. On the other hand, the medium start-up function allows omitting the operation to call the registration information at the start-up and the exchange of the print medium M.

According to this embodiment, the sensor (the upstream side position detection sensor 71 or the downstream side position detection sensor 72) that detects the position of the print medium M in the feed direction is provided. The plurality of printing setting items include the item regarding the sensor corresponding to the detected portion (the eye mark or the gap) included in the print medium M.

In this embodiment, these configurations also reduce the labor of the user and the convenience is improved.

While some embodiments of the present invention have been described, the above-described embodiments illustrate some examples to which the present invention is applicable and are not intended to limit the technical scope of the present invention to the specific configurations of the above-described embodiments.

The present application claims priority to Japanese Patent Application No. 2019-024648 filed on Feb. 14, 2019 to Japan Patent Office, the entire content of which is incorporated herein by reference.

The invention claimed is:

1. A printer comprising:
   a display unit configured to display information; and
   a control unit configured to store a plurality of sets of printing setting items, each set including a plurality of printing setting items used for printing, wherein the plurality of printing setting items in each set includes a setting item regarding a type of a print medium, wherein the control unit is configured to operate in:
      a first mode in which the control unit causes the display unit to selectably display a plurality of icons, each icon representing one of the sets of printing setting items, and causes the printer to print only upon selection of one of the plurality of icons, and
      a second mode in which the control unit causes the printer to print based on a predetermined one of the sets of printing items that is associated with the second mode without requiring a selection of an icon representing said predetermined one of the sets of printing items.

2. The printer according to claim 1, wherein
   each of the plurality of sets of printing setting items is associated with a different type of the print medium, and
   each type of the print medium has respective printing start position, and
   when the control unit operates in the first mode, the control unit matches a position of the print medium with the printing start position based on the setting item regarding the type of the print medium.

3. The printer according to claim 1, comprising:
   an input unit configured to receive a command from a user, wherein:
   the control unit is configured to, during a registration process:
      sequentially obtain information corresponding to the plurality of printing setting items in each set from the input unit to generate each set of printing setting items, and
      omit obtaining information not corresponding to the setting item regarding the type of the print medium.

4. The printer according to claim 1, wherein:
   the plurality of printing setting items in each set includes a setting item regarding a label waste prevention function, which is a function by which, when the type of the print medium is a label print medium, a label at a distal end portion of the label print medium is printed so as not to be wasted.

5. The printer according to claim 1, comprising:
   a sensor configured to detect a position of the print medium in a feed direction, wherein:
   the plurality of printing setting items includes a setting item indicating the detected position.

6. The printer according to claim 1, wherein:
   when the control unit operations in the second mode, the control unit causes the printer to print based on said predetermined one of the plurality of sets of printing setting items without displaying an icon corresponding to said predetermined one of the plurality of sets of printing setting items.

7. A control method comprising:
   during a registration process:
      displaying, on a display unit, a print medium selection screen, and receiving a selection of a type of print medium,
      after receiving the selection of the type of print medium, sequentially obtaining information corresponding to a plurality of printing setting items corresponding to the selected print medium to generate a set of printing setting items, without obtaining information corresponding to printing setting items corresponding to a print medium other than the selected print medium, and
      storing the generated set of printing setting items to the control unit;
   while operating in a first mode, causing the display unit to selectably display a plurality of icons, each icon representing one of a plurality of sets of printing setting items, and causing the printer to print only upon selection of one of the plurality of icons; and while operating in a second mode, causing the printer to print based on a predetermined one of the plurality of sets of printing setting items that is associated with the second mode without requiring a selection of an icon representing said predetermined one of the plurality of sets of printing setting items.

8. A non-transitory computer-readable medium storing a program executable by a processor in a printer, the program causing the process to execute steps of:

during a registration process:

displaying, on a display unit, a print medium selection screen, and receiving a selection of a type of print medium, after receiving the selection of the type of print medium, sequentially obtaining information corresponding to a plurality of printing setting items corresponding to the selected print medium to generate a set of printing setting items, without obtaining information corresponding to printing setting items corresponding to a print medium other than the selected print medium, and storing the generated set of printing setting items to the control unit;

while operating in a first mode, causing the display unit to selectably display a plurality of icons, each icon representing one of a plurality of sets of printing setting items, and causing the printer to print only upon selection of one of the plurality of icons; and while operating in a second mode, causing the printer to print based on a predetermined one of the plurality of sets of printing setting items that is associated with the second mode without requiring a selection of an icon representing said predetermined one of the plurality of sets of printing setting items.

* * * * *